United States Patent
Feldmann

(10) Patent No.: US 9,567,022 B2
(45) Date of Patent: Feb. 14, 2017

(54) VEHICLE TRACK

(75) Inventor: Thomas Brian Feldmann, Hamilton, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 438 days.

(21) Appl. No.: 13/424,459

(22) Filed: Mar. 20, 2012

(65) Prior Publication Data

US 2012/0242143 A1 Sep. 27, 2012

Related U.S. Application Data

(60) Provisional application No. 61/454,747, filed on Mar. 21, 2011.

(51) Int. Cl.
*B62D 55/24* (2006.01)

(52) U.S. Cl.
CPC .................................. *B62D 55/244* (2013.01)

(58) Field of Classification Search
CPC .............................. B62D 55/24; B62D 55/244
USPC ............... 305/157, 160, 165, 166, 167, 170, 174, 305/178, 179
See application file for complete search history.

(56) References Cited

U.S. PATENT DOCUMENTS

| | | | | |
|---|---|---|---|---|
| 2,040,696 A | * | 5/1936 | Johnston | 305/171 |
| 2,461,150 A | * | 2/1949 | Flynn et al. | 305/180 |
| 2,845,308 A | * | 7/1958 | Woltemar | 305/181 |
| 3,747,996 A | * | 7/1973 | Huber | 305/50 |
| 6,241,327 B1 | * | 6/2001 | Gleasman et al. | 305/157 |
| 6,974,196 B2 | * | 12/2005 | Gagne et al. | 305/166 |
| 2002/0033643 A1 | * | 3/2002 | Soucy et al. | 305/178 |
| 2004/0140138 A1 | * | 7/2004 | Brazier | 180/9.21 |
| 2006/0248484 A1 | * | 11/2006 | Baumgartner et al. | 716/3 |
| 2008/0136255 A1 | * | 6/2008 | Feldmann et al. | 305/167 |

FOREIGN PATENT DOCUMENTS

| | | |
|---|---|---|
| EP | 1211169 A2 | 6/2002 |
| EP | 1953070 A1 | 8/2008 |
| EP | 2014542 A1 | 1/2009 |
| JP | H0632262 A | 2/1994 |

* cited by examiner

*Primary Examiner* — S. Joseph Morano
*Assistant Examiner* — Jean Charleston
(74) *Attorney, Agent, or Firm* — Alvin T. Rockhill

(57) ABSTRACT

The tracks of the present invention have drive faces which are tapered surfaces, such as a convex tapered surface which extends laterally over the drive surface of the lugs. The utilization of lugs having tapered drive faces improves the performance and durability of the track. The tracks having the drive face design of this invention also allow for more power to be delivered without damaging the track or causing excessive wear.

19 Claims, 6 Drawing Sheets

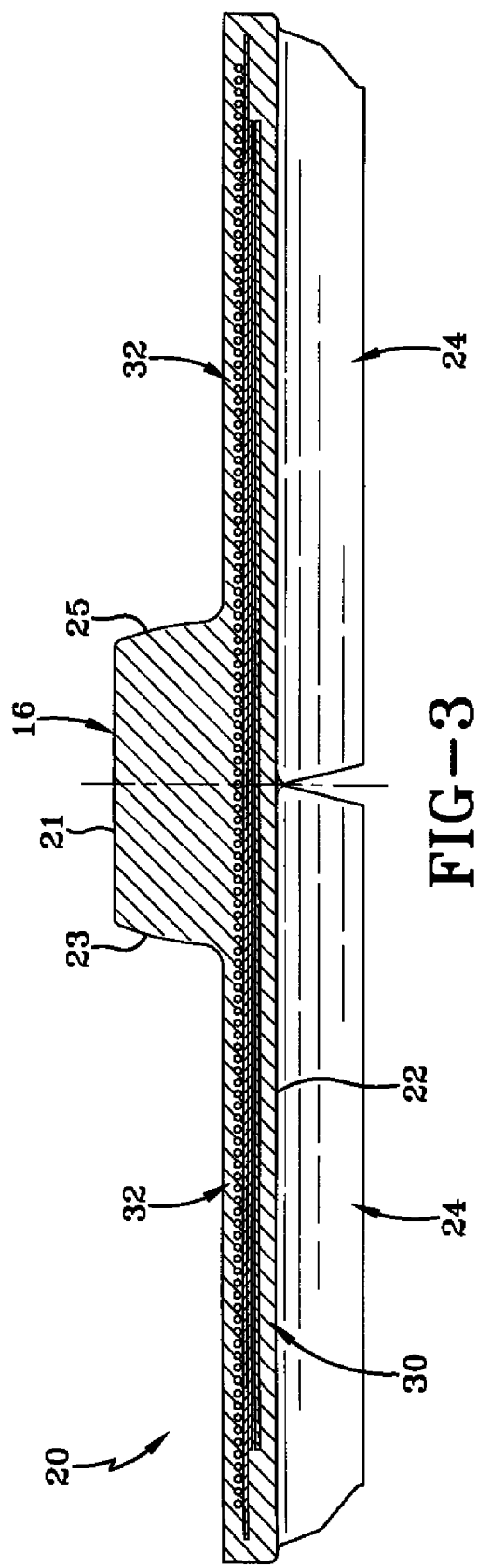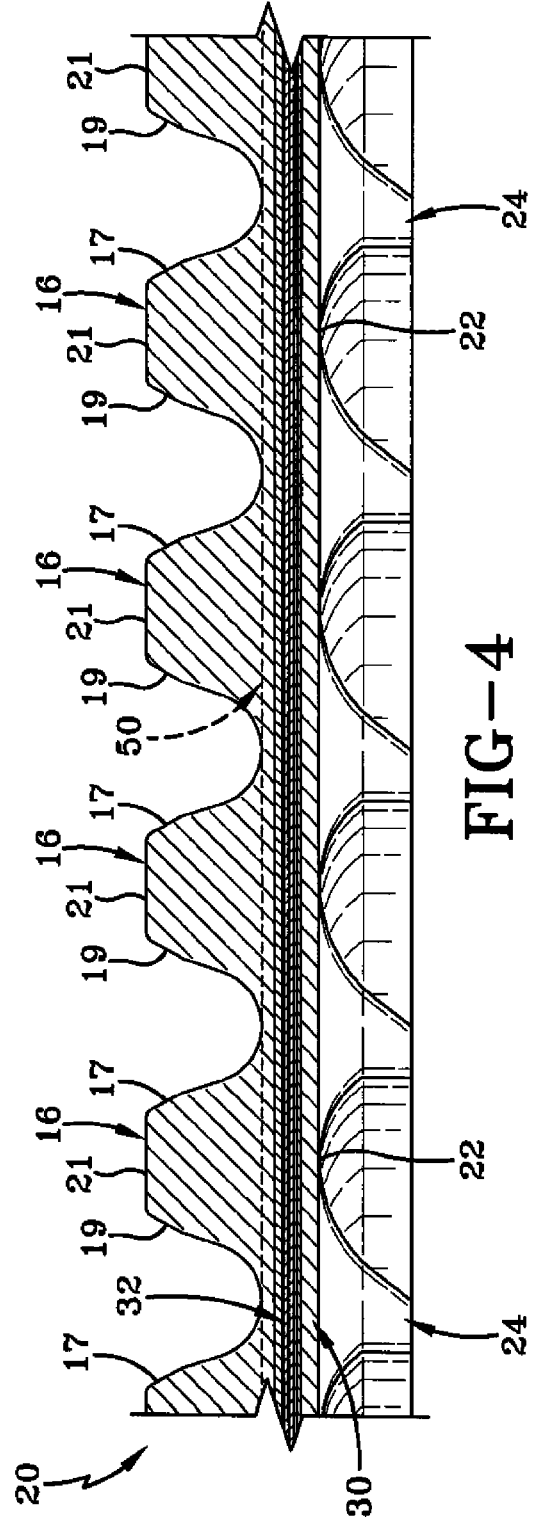

VEHICLE TRACK

The benefit of U.S. Provisional Patent Application Ser. No. 61/454,747, filed on Mar. 21, 2011, is claimed hereby. The teachings of U.S. Provisional Patent Application Ser. No. 61/454,747 are incorporated herein by reference in their entirety.

BACKGROUND OF THE INVENTION

Positive drive, endless rubber tracks such as those used on agricultural or industrial vehicles typically have an internal, center row of individual drive lugs which engage drive bars on a drive wheel. The drive lugs typically function to transmit power from the drive wheel to the track and also serve the purpose of retaining the track on the vehicle. Such lugs are frequently referred to as guide-drive lugs or are simply referred to as drive lugs. During use recurring contract between the drive bars on the drive wheels and drive lugs causes surface wear at the points of contact. Such wear occurs as the vehicle is driven and maneuvered during normal operations. In general, the level of wear increases with increasing power levels and speed. In some cases vehicle tracks need to be replaced due to an excessive level of wear on the drive lugs. Accordingly, vehicle tracks having guide-drive lugs which are more resistant to wear would be a valuable advance in the state of the art.

United States Patent Publication No. 2008/0136255 A1 discloses an endless track belt for use in an industrial or agricultural vehicle. The endless rubber track belts described therein include a rubber carcass having an inner surface having one or more drive lugs and an outer surface having tread lugs. The drive lugs include reinforcement layers that partially or substantially cover all or a portion of the end faces of the drive lugs. The reinforcement layers may include continuous strips, or discrete strips. The reinforcement layer may also be fabric cutouts to match the shape of the drive end faces of the drive lugs.

U.S. Pat. No. 6,974,196 B2 describes an endless track for an industrial or agricultural vehicle consisting of a body formed of a rubber material having an outer surface displaying a series of ground engaging profiles longitudinally spaced along the surface and an inner surface displaying a series of longitudinally spaced drive lugs adapted to be engaged by drive sprockets on the vehicle driving assembly. The body of the endless track is fabric reinforced. One layer of fabric longitudinally extends at a distance from the inner surface of the track and has a width slightly less than the width of the drive lugs so that the fabric may extend inside the drive lugs to increase their rigidity.

SUMMARY OF THE INVENTION

The tracks of the present invention have drive faces which are tapered surfaces, such as a convex tapered surface which extends laterally over the drive surface of the lugs. The utilization of lugs having tapered drive faces improves the performance and durability of the track. The tracks having the drive face design of this invention also allow for more power to be delivered without damaging the track or causing excessive wear.

The present invention more specifically discloses an endless vehicle track comprising a body formed of an elastomeric material having an outer surface displaying a series of ground engaging profiles longitudinally spaced along said surface and an inner surface displaying a series of longitudinally spaced drive lugs adapted to be engaged by drive sprockets on said vehicle for retaining said track on said vehicle and for driving said vehicle, said drive lugs having a given width and height, said drive lugs having drive faces with tapered surfaces, wherein the tapered surfaces extend laterally over at least 15 percent of the lateral surface of the lug.

In one embodiment of this invention the endless vehicle track comprises a body formed of an elastomeric material having an outer surface displaying a series of ground engaging profiles longitudinally spaced along said surface and an inner surface displaying a series of longitudinally spaced drive lugs adapted to be engaged by drive sprockets on said vehicle for retaining said track on said vehicle and for driving said vehicle, said drive lugs having a given width and height, said drive lugs having drive faces which are convex tapered surfaces extending laterally over the drive surface of the lugs.

BRIEF DESCRIPTION OF THE DRAWINGS

FIG. 3 is a cross-sectional view of the conventional endless rubber track of FIG. 2, taken generally along line 3-3 in FIG. 2.

FIG. 4 is a cross-sectional view of the conventional endless rubber track of FIG. 2, taken generally along line 4-4 in FIG. 2.

DETAILED DESCRIPTION OF THE INVENTION

Figure 1:
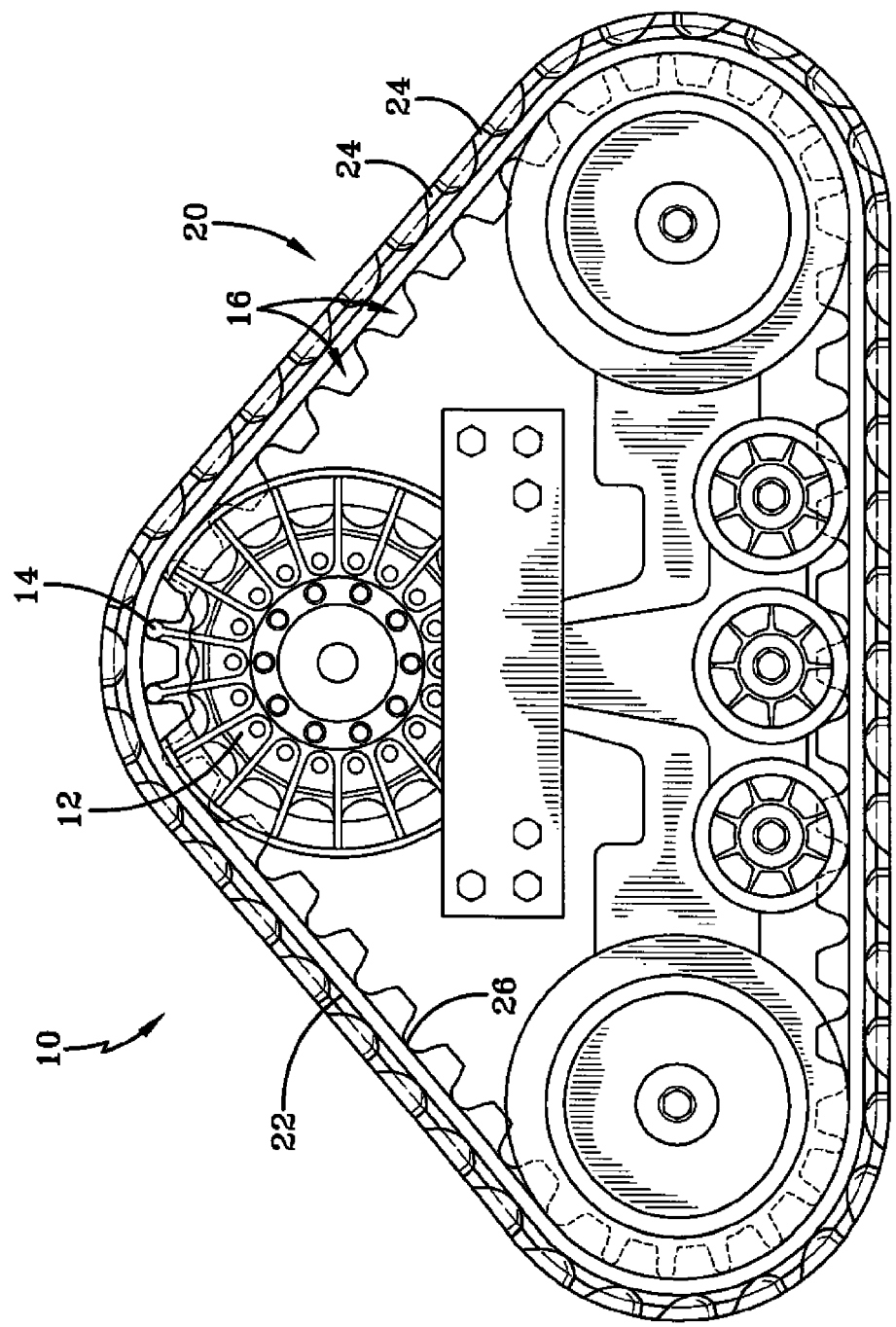
FIG. 1 is an elevation view of a conventional endless rubber track assembly.

FIG. 1 illustrates a conventional track assembly 10 which may be used on an industrial or agricultural vehicle (not shown). The track assembly 10 includes a drive wheel 12 comprising a plurality of teeth or drive bars 14 that are positioned for mating engagement with guide-drive lugs 16. The drive lugs 16 are mounted on a rubber track 20 having an endless elongate carcass. The endless track carcass has an outer surface 22 comprising a plurality of ground engaging tread lugs 24 and an inner surface 26 with a plurality of guide-drive lugs 16, typically located on the center portion of the carcass.

Figure 2:
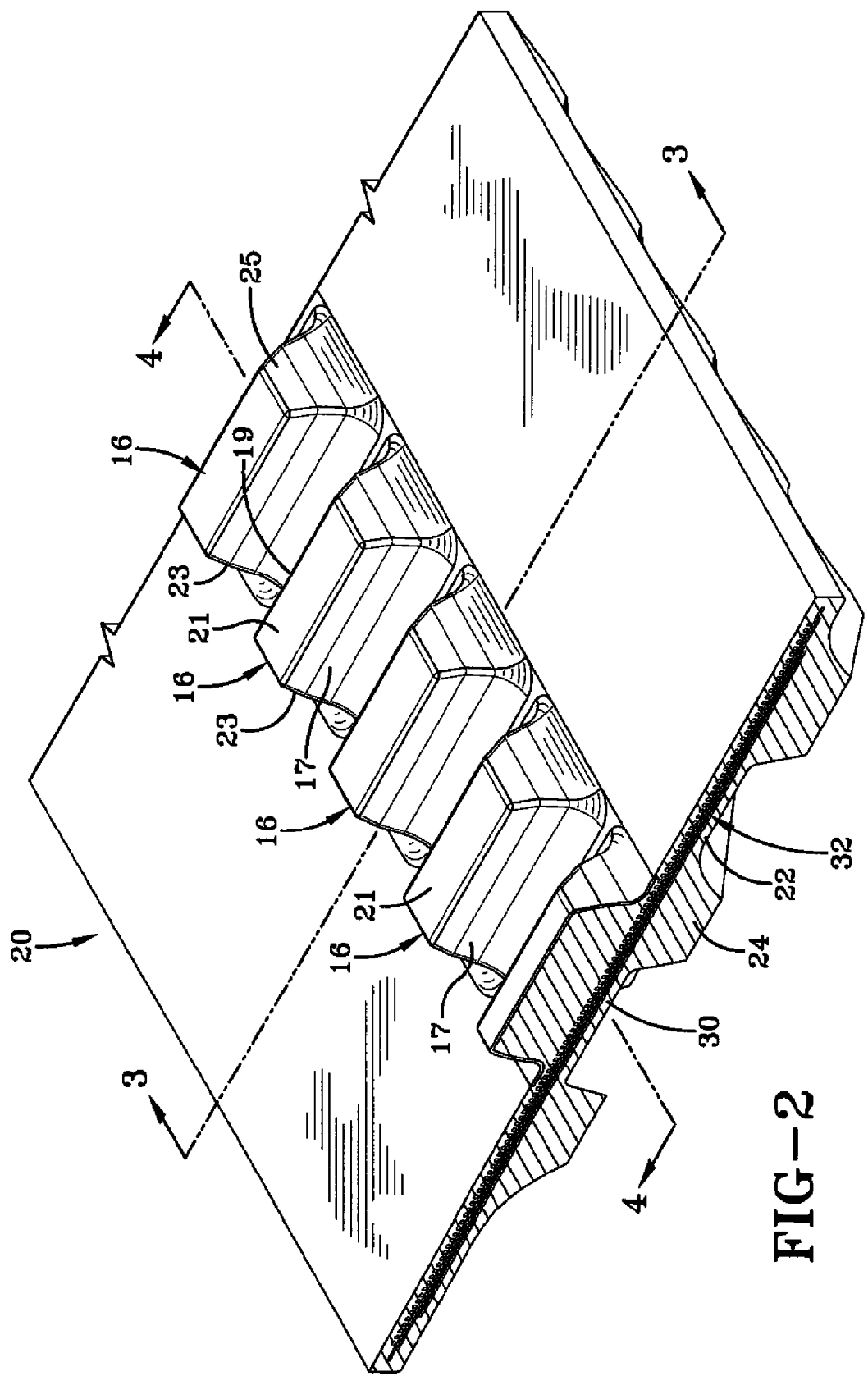
FIG. 2 is a perspective view of a section of the conventional endless rubber track shown in FIG. 1.

As shown in FIG. 2, each guide-drive lug 16 of a conventional track comprises an elongate shaped bar with inclined drive faces 17, 19, and an upper flat face 21. The corners of the joined faces are rounded to reduce stress concentrations. End faces 23, 25 may be flat.

As shown in FIG. 3 and FIG. 4, the belt carcass 20 of a conventional track typically comprises one or more layers of gum rubber or elastomeric material 30. Embedded within the gum rubber are one or more reinforcement layers 32 which extend transversely along the track width. The reinforcement layers 32 may comprise longitudinal cable reinforcement layers, fabric reinforcement layers, or any other reinforcement layer known to those skilled in the art. The guide-drive lugs 16, as shown in FIGS. 2-4 are comprised of natural rubber or synthetic rubber, such as emulsion styrene-butadiene rubber, solution styrene-butadiene rubber, synthetic polyisoprene rubber, polybutadiene rubber, or a blend of natural and synthetic rubbers.

Figure 5:
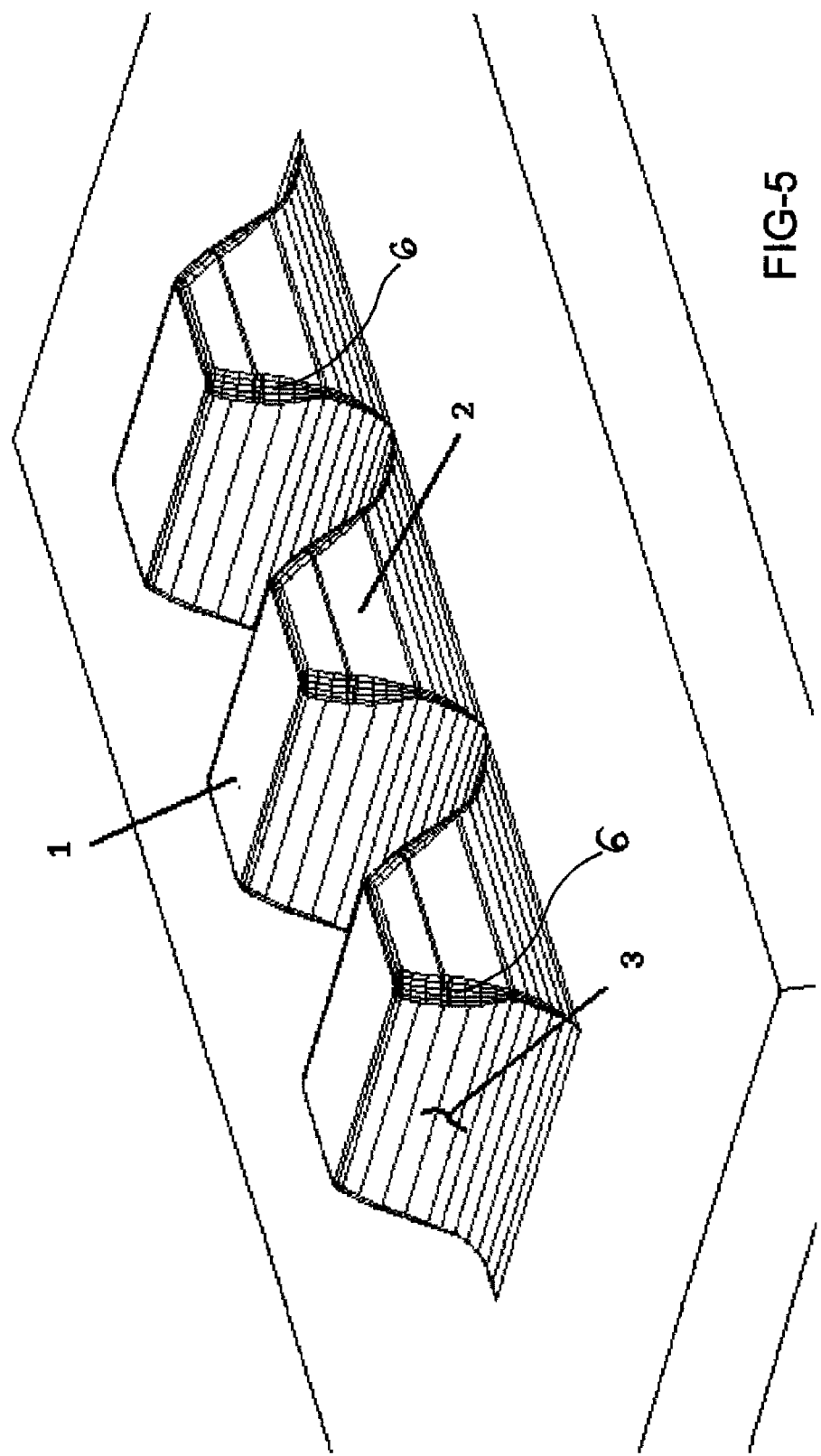
FIG. 5 is a perspective view of a conventional endless rubber track having a essentially flat drive surfaces.

FIG. 5 illustrates a conventional track wherein the corners 6 of the joined faces of the drive lugs 1 are rounded to reduce stress concentrations. In operation of such conventional tracks the longitudinal surfaces 2 of the lugs 1 contact the inner edges of the paired wheels when the track wanders side to side. In such tracks the lugs 1 have drive surfaces 3 which are essentially straight from side to side.

Figure 6:
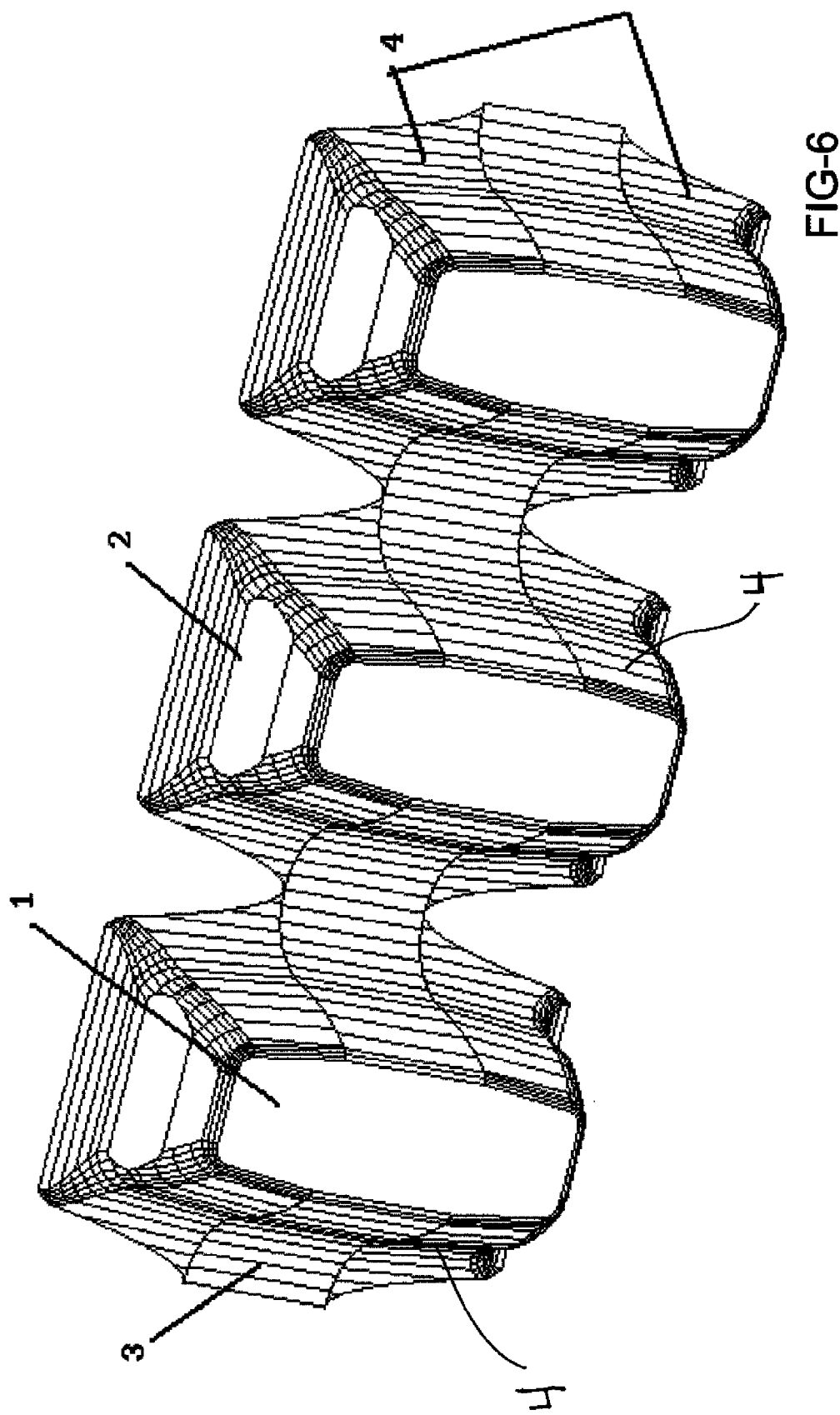
FIG. 6 is a perspective view of an endless rubber track of one embodiment of this invention wherein the drive lugs have tapered surfaces.

FIG. 6 illustrates one embodiment of this invention wherein the longitudinally spaced drive lugs 1are adapted to be engaged by drive sprockets on said vehicle for retaining said track on said vehicle and for driving said vehicle, said drive lugs having a given width and height, said drive lugs having drive faces with a straight drive face area 3 and tapered surfaces 4 to each side of the straight drive face area, wherein the tapered surfaces 4 extend laterally over at least 15 percent of the lateral surface of the lugs 1. These lugs are adapted for utilization on an endless vehicle track comprising a body formed of an elastomeric material having an outer surface displaying a series of ground engaging profiles longitudinally spaced along said surface and an inner surface displaying a series of the lugs. The tracks of this invention are as illustrated in FIGS. 1-5 except for having drive lugs with drive faces that are tapered or curved surfaces as viewed laterally along their drive faces. The tapered surfaces typically extend laterally over at least 20 percent of the lateral surface of the lug and can extend laterally over at least 25 percent of the lateral surface of the lug. The tapered surfaces on the drive face of the lugs extend from the outer lateral edges of the drive face and typically extend over less than 45 percent of the lateral surface of the lugs. In some cases the tapered surfaces on the drive face of the lugs extend from the outer lateral edges of the drive face and extend over less than 40 percent or even 35 percent of the lateral surface of the lugs.

The tapered surfaces can be convex tapered or curved surfaces. The convex tapered or curved surfaces on the drive face of the lugs can extend from the outer lateral edges of the drive face and extend over less than 35 percent of the lateral surface of the lugs. In such tracks the convex tapered surfaces on the drive faces of the lugs normally extend from the outer lateral edges of the drive face and extend over at least 50 percent of the lateral surface of the lugs. More typically, the tapered surfaces on the drive faces of the lugs will extend from the outer lateral edges of the drive face and extend over at least 60 percent or even 80 percent of the lateral surface of the drive faces of the drive lugs.

Figure 7:
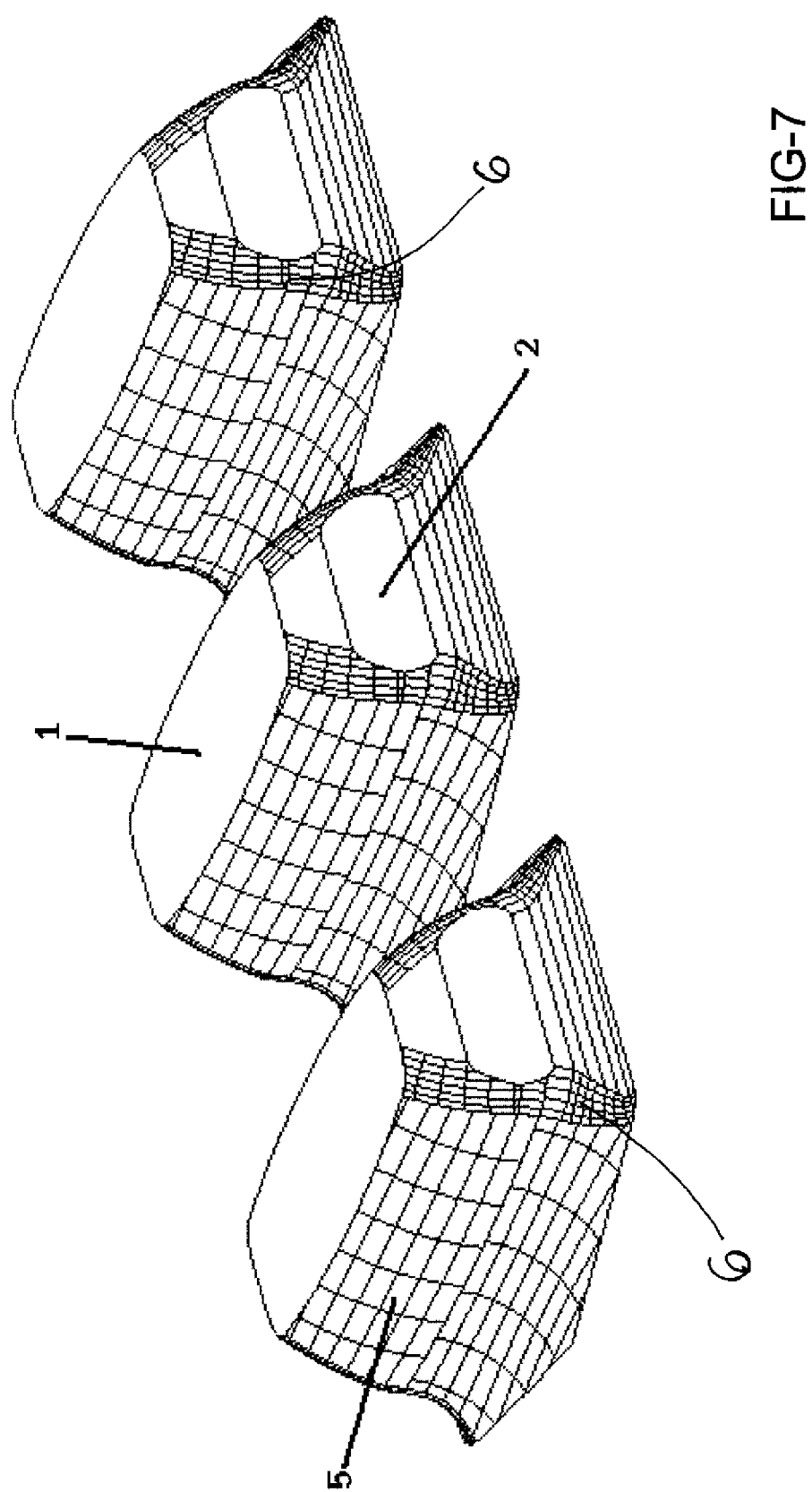
FIG. 7 is a perspective view of an endless rubber track of another embodiment of this invention wherein the drive lugs have drive faces which are convex tapered surfaces that extend laterally over the entire drive surfaces of the drive lugs.

Another embodiment of this invention is illustrated in FIG. 7 wherein the drive faces of the drive lugs are convex tapered surfaces which extend laterally over the drive surfaces of the lugs. As illustrated in FIG. 7 the drive surfaces 5 can be convex curved surfaces that extend laterally over the entire surface of the drive lugs from one side to the other.

While certain representative embodiments and details have been shown for the purpose of illustrating the subject invention, it will be apparent to those skilled in this art that various changes and modifications can be made therein without departing from the scope of the subject invention.

What is claimed is:

1. An endless vehicle track comprising a body formed of an elastomeric material having an outer surface displaying a series of ground engaging profiles longitudinally spaced along said surface and an inner surface displaying a series of longitudinally spaced drive lugs adapted to be engaged by drive sprockets on said vehicle for retaining said track on said vehicle and for driving said vehicle, said drive lugs having a given width and height, said drive lugs having a longitudinal surface of the drive lug, said drive lugs having a drive face with a straight drive face area and tapered surfaces to each side of the straight drive face area, wherein the straight drive face area extends in a straight manner laterally with respect to the drive face of the drive lugs, wherein the tapered surfaces are convex tapered surfaces which extend laterally over at least 15 percent of the drive face of the lugs.

2. The endless vehicle track of claim 1 wherein the tapered surfaces extend laterally over at least 20 percent of the drive face of the lugs.

3. The endless vehicle track of claim 2 wherein the tapered surfaces on the drive face of the lugs extend from the outer lateral edges of the drive face and extend laterally over less than 40 percent of the drive face of the lugs.

4. The endless vehicle track of claim 2 wherein the tapered surfaces on the drive face of the lugs extend from the outer lateral edges of the drive face and extend laterally over less than 35 percent of drive face of the lugs.

5. The endless vehicle track of claim 1 wherein the tapered surfaces extend laterally over at least 25 percent of the drive face of the lugs.

6. The endless vehicle track of claim 1 wherein the tapered surfaces on the drive face of the lugs extend from the outer lateral edges of the drive face and extend laterally over less than 45 percent of the drive face of the lugs.

7. The endless vehicle track of claim 1 which further includes a straight drive face area which extends laterally over at least 10 percent of the drive face of the lugs.

8. The endless vehicle track of claim 7 wherein the straight drive face area is positioned between the tapered surfaces on the drive faces of the lugs.

9. The endless vehicle track of claim 1 which further includes a straight drive face area which extends laterally over at least 20 percent of the drive face of the lugs.

10. The endless vehicle track of claim 1 which further includes a straight drive face area which extends laterally over at least 25 percent of the drive face of the lugs.

11. An endless vehicle track comprising a body formed of an elastomeric material having an outer surface displaying a series of ground engaging profiles longitudinally spaced along said surface and an inner surface displaying a series of longitudinally spaced drive lugs adapted to be engaged by drive sprockets on said vehicle for retaining said track on said vehicle and for driving said vehicle, said drive lugs having a given width and height, said drive lugs having a drive face which extend laterally over entire surface of the lugs from one side to the other and convex tapered surfaces, wherein the tapered surfaces extend laterally over the drive face of the lugs.

12. The endless vehicle track of claim 11 wherein the wherein the convex tapered surfaces on the drive face of the lugs extend from the outer lateral edges of the drive face and extend laterally over at least 35 percent of the drive face of the lugs.

13. The endless vehicle track of claim 11 wherein the wherein the convex tapered surfaces on the drive face of the lugs extend from the outer lateral edges of the drive face and extend laterally over at least 50 percent of drive face of the lugs.

14. The endless vehicle track of claim 11 wherein the wherein the tapered surfaces on the drive face of the lugs extend from the outer lateral edges of the drive face and extend laterally over at least 60 percent of drive face of the lugs.

15. The endless vehicle track of claim 11 wherein the wherein the tapered surfaces on the drive face of the lugs extend from the outer lateral edges of the drive face and extend laterally over at least 80 percent of the drive face of the lugs.

16. An endless vehicle track comprising a body formed of an elastomeric material having an outer surface displaying a series of ground engaging profiles longitudinally spaced along said surface and an inner surface displaying a series of longitudinally spaced drive lugs adapted to be engaged by drive sprockets on said vehicle for retaining said track on said vehicle and for driving said vehicle, said drive lugs having a given width and height, said drive lugs having drive faces which are convex tapered surfaces, wherein the convex tapered surfaces extend laterally over the drive face of the lugs.

17. The endless vehicle track of claim 16 wherein the convex tapered surfaces extend essentially over the entire drive faces of the lugs.

18. The endless vehicle track of claim 16 wherein the convex tapered surfaces extend completely over the entire drive faces of the lugs.

19. The endless vehicle track of claim 16 wherein the convex tapered surfaces are curved surfaces.

* * * * *